Patented Aug. 24, 1954

2,687,385

UNITED STATES PATENT OFFICE 2,687,385

WIRE COATING COMPOSITION

Emil H. Olson, Muskegon, Mich., assignor to Anaconda Wire and Cable Company, a corporation of Delaware No Drawing. Application December 29, 1951, Serial No. 264,224

3 Claims. (Cl. 260—15)

This invention relates to an improved wire coating composition for use in making insulated magnet wire of the enameled magnet wire type. The invention further contemplates the provision of an improved magnet wire made by applying to a metallic conductor a thin film of the new coating composition. This invention is a continuation-in-part of my application Serial No. 76,661, filed February 15, 1949, now Patent No. 2,570,476, dated October 9, 1951.

In my aforesaid patent, I have described and claimed a wire coating composition that sets by gelation, consisting essentially of a cellulose ester of one or more aliphatic acids containing from 2 to 4 carbon atoms, dissolved in a solvent composed essentially of 15% to 30% of a lower monohydroxy alkanol, 50% to 60% of benzine or one or more of its methyl homologues, and 10% to 30% of a lower dialkyl ketone. The amount of ester employed in this coating composition in relation to the amount of solvent is sufficient to impart to the composition a viscosity in the range of 600 to 1500 centipoises at a temperature of 100° F., but in any event is not less than about 12% by weight of the composition. It is characteristic of the composition that it sets to a nonflowing solid by gelation upon being cooled to room temperature, say, about 65° F., without solvent evaporation being necessary for such solidification to occur.

The aforesaid coating composition has the advantage that a single coat applied to a wire, in an operation involving drawing the wire through a bath of the composition at a temperature above its gelation temperature, suffices to form on the wire a coating of adequate thickness to meet the dielectric requirements of wire coating compositions as generally applied to magnet wires; and furthermore, the prolonged baking operation that is a necessary part of making conventional enameled magnet wires is eliminated. Wires may be coated with the gelable coating composition at much higher rates of wire travel through the coating bath than is possible with conventional wire enamels. However, a disadvantage of the coating composition of my aforesaid application is that for some purposes its resistance to abrasion is undesirably low. For this reason, wires coated with the composition of my aforesaid patent have not found many opportunities for use in structures where abrasion resistance of the wire coating is of marked importance, as, for example, in motor coils where the coils must be forced into slots in which they fit tightly.

I have discovered that the abrasion resistance of insulating coatings formed on magnet wire by gelable lacquer coating compositions of the character described in my aforementioned patent can be very much increased by incorporating in the lacquer composition a minor proportion of a resinous condensation polymer of the urea formaldehyde or melamine formaldehyde type. Based on this discovery, the present invention provides a wire coating composition consisting essentially of a solute composed essentially of 70% to 95% by weight of a cellulose ester of at least one aliphatic acid containing 2 to 4 carbon atoms (e. g. cellulose acetate butyrate) and 5% to 30% by weight of a resinous condensation polymer with a lower aliphatic aldehyde of a substance selected from the group consisting of urea, thiourea, cyanamide, guanidine, and melamine (e. g. urea formaldehyde resin), said solute being dissolved in a solvent composed essentially of approximately 1 part by weight of a lower monohydroxy alkanol, 3 parts by weight of a substance selected from the group consisting of benzene and its methyl homologues, and 1 part by weight of a lower dialkyl ketone (however, thoroughly satisfactory coating compositions may be made in which the proportions of the solvent constituents differ substantially from those given). The proportions of solute to solvent in the coating composition are such as to yield a lacquer which is fluid at temperatures above, say, 100° F., but which gels to a non-flowing solid at or near room temperature, say, at about 65° F. For best results the proportion of solute to solvent is in the range from 1:10 to 1:6, i. e. the solute constitutes from 10% to 17% by weight of the composition; and in any event the amount of solute used is sufficient to impart to the composition a viscosity at 100° F. in the range from 600 to 1500 centipoises. Generally it is desirable, but it is not essential, to incorporate in the lacquer composition one or more chemically inert pigments or opaquing agents, which ingredients may be employed in the proportions of about 3% to 10% by weight of the solute composition. Other ingredients which do not essentially alter the character of the coating composition also may be added as desired.

It is apparent that the coating composition of this invention is generally the same as that described in my aforementioned Patent No. 2,570,476, but with the replacement of a portion of the cellulose ester with a corresponding amount of the resinous condensation polymer. The solvent composition is indeed that of my said patent, and here, as in that patent, I use a lower monohydroxy alkanol boiling at a temperature of about 100° C. or less at atmospheric pressure. I may, of course, also use low boiling commercial alcohol-base solvents such as the one composed of about 92% commercial ethyl alcohol, about 4.3% methyl alcohol, about 1.4% methyl isobutyl ketone, about 1% ethyl acetate, and about 1% hexane mentioned in my aforementioned patent. The particular solvent material as noted above and as set forth in the claims is, of course, broad enough to include such monohydroxy alkanol base solvents such as the commercial solvent as above noted. Similarly, I use a lower dialkyl ketone having from 3 to 6 carbon atoms and boiling at a temperature of about 100° C. or less at atmospheric pressure.

The cellulose esters that are used in the new lacquer composition are the same that have been used heretofore in dip coating lacquers and in the wire coating composition of my aforementioned patent, and include cellulose acetate, cellulose propionate, cellulose butyrate, and mixed esters such as cellulose acetate propionate containing, say, 15% to 20% acetyl and 25% to 35% propionyl, and cellulose acetate butyrate containing, say, 12% to 18% acetyl and 15% to 40% butyryl.

The resinous condensation polymer characteristically employed in the coating composition of the present invention is a thermosetting resin such as is formed by condensation of urea, thiourea, cyanamide, guanidine or melamine with a lower aliphatic aldehyde (usually an aldehyde containing from 1 to 4 carbon atoms, and most commonly formaldehyde), or with such an aldehyde and an alcohol, e. g., butanol.

Such resin may be incorporated in the lacquer composition either in the unpolymerized form or as a partially polymerized product. In either case, it is most advantageously incorporated in the form of a solution containing, say 50% to 75% by weight of resin constituents and the balance solvents such as xylol and butanol. In general, I prefer to employ the solutions of these condensation polymers which are commercially available. In making up the composition from such a solution, the amount of the non-volatile polymer constituent contained therein is alone taken into account in determining the solute proportions of the composition, and the volatile solvent constituents of the polymer solution are taken into acount as components of the solvent of the lacquer composition.

Although particularly satisfactory results are obtained by employing a urea formaldehyde condensation polymer or other condensation polymer of the character mentioned above in preparing lacquer compositions according to the invention, any thermosetting resin which is compatible with the cellulose ester and which can be dissolved in the solvent component of the composition may be employed with beneficial results.

Following is an example of a typical wire coating composition prepared in accordance with this invention:

| Ingredient | Parts by Weight | Percent |
| --- | --- | --- |
| Cellulose acetate butyrate | 11 | 10.5 |
| Urea formaldehyde condensation polymer | 1.2 | 1.1 |
| Ferric oxide (pigment) | 1.3 | 1.2 |
| Titanium dioxide (opaquing agent) | 0.7 | 0.7 |
| Mixed lower monohydroxy alkanols (mostly ethyl alcohol) | 19.2 | 18.2 |
| Toluol | 54.0 | 51.2 |
| Acetone | 18.0 | 17.1 |

In this composition, the solids constitute 14.2 parts by weight, or 13.5% by weight of the composition, and the solvent components constitute 90 parts by weight, or 86.5% by weight of the composition. This composition has a viscosity of about 1000 to 1200 centipoises at 100° F. and solidifies by gelation when cooled to a temperature of about 65° F.

Coating compositions prepared in accordance with the invention are most advantageously applied to wires by the method described and claimed in United States Patent No. 2,547,047 to Harry L. Saums, John H. Vail and Howard W. Sturgis, using apparatus of the character described and claimed in United States Patent No. 2,558,993 to Howard W. Sturgis and Emil H. Olson. Briefly, the method of applying the coating composition to the wire involves passing the wire into position to a bath of the composition maintained at a temperature well above its gelation temperature, and then withdrawing the wire with a film of the coating composition adhering thereto. This film cools almost at once as the wire emerges into the room atmosphere to below its gelation temperature and thereby sets almost immediately to a non-flowing solid film. Eventually the volatile constituents of the gelled film evaporate, leaving a wire coated with an intimate blend of the non-volatile constituents of the lacquer. The finished wire thus comprises a metallic conductor having thereon a thin substantially uniform and continuous coating composed essentially of 70% to 95% by weight of a cellulose ester of at least one aliphatic acid containing from 2 to 4 carbon atoms (e. g., cellulose acetate butyrate), intimately blended with 5% to 30% by weight of a resinous condensation polymer of a lower aliphatic aldehyde with a substance selected from the group consisting of urea, thiourea, cyanamide, guanidine, and melamine (e. g., a urea formaldehyde resin).

It is a major advantage of coating compositions prepared in accordance with the invention that the insulating film formed by its use on the surface of the wire is substantially continuous with but very few and widely separated pinholes even when the coating is applied at a high rate of wire travel. Also, the coating is uniform in thickness about the periphery of the wire and along its length, and, most important, it is tightly adherent to the wire and highly resistant to abrasion.

The remarkably improved characteristics of wire coated with the composition of this invention, in comparison with a wire coated with a gelable lacquer prepared in accordance with my aforementioned patent, is illustrated by the test results summarized in Table I below. In each of the tests mentioned, the wire designated as "wire A" was prepared in accordance with this invention by coating a bare No. 36 A. W. G. copper conductor with the particular coating composition given by way of example above; and the wire designated as "wire B" was made by applying to a bare No. 36 A. W. G. copper conductor a coating composition identical in all respects with that of the above example, save only that the urea formaldehyde was omitted and a corresponding increase was made in the amount of cellulose acetate butyrate employed in the composition.

*Table I*

| | Wire A | Wire B |
| --- | --- | --- |
| Scrape Test (wire aged 1 week) | 9 | 6 |
| Continuity Test [1] | 2.3 | 7.3 |
| Abrasion Test (wire aged 1 day) [1] | 1,850 | 40 |

[1] Figures given for these tests are averages of three separate determinations.

The manner in which the tests reported in the table were carried out is as follows:

*Scrape test.*—The so-called Delco scrape test was used in obtaining the data given in the table. In this test the wire is pulled horizontally under the point of a needle, the needle being mounted so that it bears on the wire with a weight that can be varied. The needle and the wire are connected together in a low-voltage electrical circuit. The weight (in ounces) on the needle which is just sufficient to cause the needle to scrape through the coating on the wire and complete the electrical circuit is taken as an index of the scrape resistance of the wire. The greater the weight with which the needle must be loaded, the better is the quality of the coating insofar as regards its scrape resistance.

*Continuity test.*—To determine the continuity of a coating film on a wire, the coated wire is drawn through a pool of mercury. The wire and mercury are connected together in an electric circuit which is completed whenever the mercury comes in direct contact with the metal of the wire through a perforation in the coating. The number of times the circuit is thus completed per hundred feet of wire drawn through the mercury pool is taken as an index of film continuity. The smaller the number of such circuit completions, the better is the quality of the wire.

*Abrasion test.*—The abrasion resistance of the coating compositions as given in the above table was determined by the use of an apparatus comprising twelve spokes, each one-quarter inch in diameter and arranged in the form of a cylindrical cage, mounted for rotation about a horizontal axis. The wire to be tested is anchored at one end, and the other end is passed over the spokes, being held down against the spokes by a weight attached to its other end. The metallic conductor of the wire and the spokes of the cage are connected together in an electrical circuit and the cage is rotated so that each spoke rubs along the coating on the wire with each revolution of the cage. When the spokes have worn through the coating and make contact with the metallic conductor, an electrical circuit which stops the apparatus is completed. The number of revolutions which the cage makes until such circuit is completed is an index of the resistance of the wire to abrasion. The greater the number of rotations which the cage makes before the circuit is completed, the greater is the abrasion resistance of the coating.

It will be noted from Table I above that wire A, made in accordance with the present invention, was greatly superior in scrape resistance and in abrasion resistance to wire B, preparing using the best gelable lacquer wire coating composition heretofore known. Even in the continuity test, the new wire showed marked improvement over the wire made by the method of my aforementioned patent. These outstanding test results are indicative of the much wider range of usefulness under conditions imposing substantial abuse on the insulating coating, of wire made in accordance with this invention.

I claim:

1. A wire coating composition consisting essentially of a solute composed essentially of 70% to 95% by weight of cellulose acetate butyrate and 5% to 30% by weight of a urea formaldehyde resinous condensation product dissolved in a solvent composed essentially of approximately 1 part by weight of a lower monohydroxy alkanol containing 1-5 carbon atoms and having a boiling point of about 100° C., 3 parts by weight of a substance selected from the group consisting of benzene and its methyl homologues, and 1 part by weight of a lower dialkyl ketone containing 3-6 carbon atoms and having a boiling point of about 100° C., said composition having a viscosity in the range from 600 to 1500 centipoises at 100° F. and gelling to a non-flowing solid at about 65° F.

2. A wire coating composition consisting essentially of a solute composed essentially of 70% to 95% by weight of a cellulose ester of at least one aliphatic acid containing from 2 to 4 carbon atoms and 5% to 30% by weight of a resinous condensation polymer of a lower aliphatic aldehyde with a substance selected from the group consisting of urea, thiourea, cyanamide, guanidine, and melamine, said solute being dissolved in a solvent composed essentially of approximately 1 part by weight of a lower monohydroxy alkanol containing 1-5 carbon atoms and having a boiling point of about 100° C., 3 parts by weight of a substance selected from the group consisting of benzene and its methyl homologues, and 1 part by weight of a lower dialkyl ketone containing 3-6 carbon atoms and having a boiling point of about 100° C., said composition having a viscosity in the range from 600 to 1500 centipoises at 100° F. and gelling to a non-flowing solid at about 65° F.

3. Magnet wire comprising a metallic conductor having thereon a thin substantially uniform and continuous coating composed of approximately 70% to 95% by weight of cellulose acetate butyrate intimately blended with 5% to 30% by weight of a urea formaldehyde resinous condensation polymer.

References Cited in the file of this patent

UNITED STATES PATENTS

| Number | Name | Date |
| --- | --- | --- |
| 2,287,930 | Canter | June 30, 1942 |
| 2,426,379 | Swain | Aug. 26, 1947 |